United States Patent [19]

Watanabe et al.

[11] Patent Number: 4,974,001
[45] Date of Patent: Nov. 27, 1990

[54] DIAPHRAGM DEVICE

[75] Inventors: Tsuneo Watanabe, Yokohama; Yoshiro Kodaka, Tokyo, both of Japan

[73] Assignee: Nikon Corporation, Tokyo, Japan

[21] Appl. No.: 445,755

[22] Filed: Dec. 4, 1989

[30] Foreign Application Priority Data

Dec. 8, 1988 [JP] Japan .................. 63-308748

[51] Int. Cl.$^5$ ............................... G03B 9/02
[52] U.S. Cl. .................... 354/274; 350/449
[58] Field of Search ............. 354/274, 270, 271.1, 354/272, 273; 350/449, 450

[56] References Cited

U.S. PATENT DOCUMENTS 4,897,682  1/1990  Kuwana ................... 354/274

FOREIGN PATENT DOCUMENTS 36-20480  4/1961  Japan .
45-29581  5/1970  Japan .
50-38735  7/1975  Japan .
63-8638  10/1988  Japan .

*Primary Examiner*—Michael L. Gellner
*Assistant Examiner*—Khanh Dang
*Attorney, Agent, or Firm*—Shapiro and Shapiro

[57] ABSTRACT

A diaphragm device in which the aperture of a diaphragm opening is variable from a minimum aperture to a fully open aperture comprises:
a plurality of diaphragm blades each having a pivot center, the edge portion of the diaphargm opening being formed by an inner edge portion in which the diaphragm blades overlap one another; and
a driving device for rotating the plurality of diaphragm blades about the pivot centers at a time;
the inner edge portion including a first arc disposed in a first portion nearest to the pivot center and having a radius of curvature ($r_1$) substantially equal to the fully open aperture, a second arc disposed in a second portion farther from the pivot center than the first portion and having a radius of curvature ($r_4$) substantially equal to the minimum aperture, at least one-third arc disposed in a third portion farther from the pivot center than the second portion and having a radius of curvature ($r_3$, $r_2$) gradually becoming greater away from the pivot center within a range smaller than the fully open aperture and greater than the minimum aperture, and straight lines or curves smoothly connecting adjacent ones of the arcs together;
The center of curvature of the arcs lying equidistantly from the pivot center of the diaphargm blades.

4 Claims, 7 Drawing Sheets

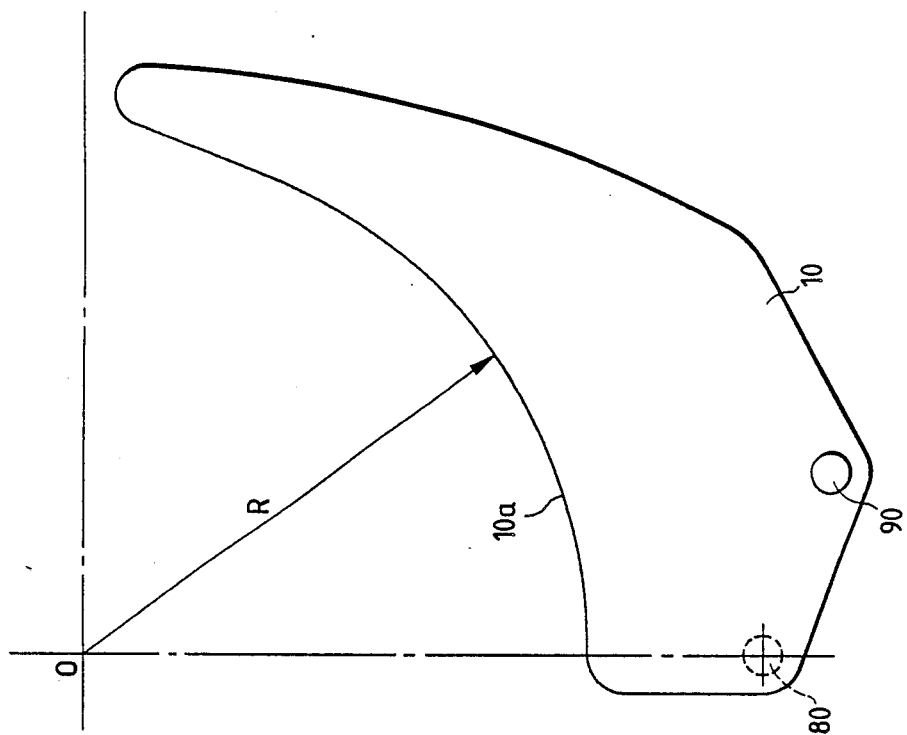
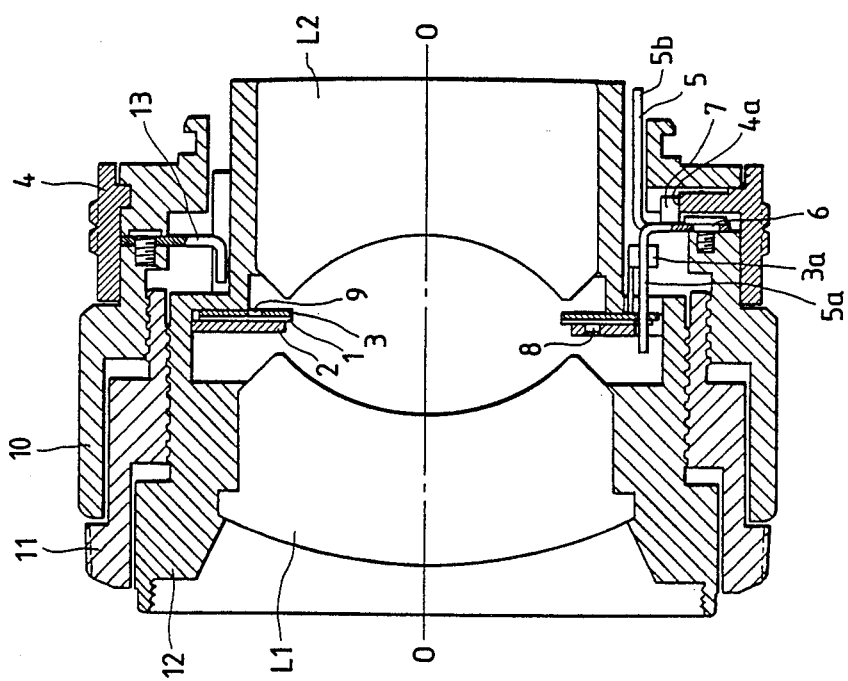
FIG. 3
PRIOR ART
FIG. 4

DIAPHRAGM DEVICE

BACKGROUND OF THE INVENTION

1. Field of the Invention

This invention relates to a diaphragm device for use in a photo-taking lens or the like.

2. Related Background Art

In one form of a diaphragm device used in a photo-taking lens or the like, a plurality of diaphragm blades are disposed about the optic axis of a diaphragm opening to cover the surroundings of the diaphragm opening and thereby limit a light passing through the diaphragm opening, and further the diaphragm blades may be pivotally rotated at a time, whereby the quantity of light passing through the diaphragm opening can be changed.

Now, it is desirable that the shape of the diaphragm opening (the surroundings of the diaphragm opening defined by the inner edge portions of the diaphragm blades) be generally approximate to a circular shape. For example, during photographing in the daytime, the shape of the diaphragm opening greatly affects the degree of vignetting of the background and as the diaphragm opening becomes more non-circular, the degree of vignetting becomes greater, that is, vignetting becomes worse. Also, during photographing in the nighttime, when a light source is photographed, the light source is vignetted into the shape of the diaphragm opening (a polygonal shape or the like) and imprinted on film. Accordingly, the vignetting of the background becomes worse, and to solve it, it becomes necessary to make the shape of the diaphragm opening approximate to a circle to the utmost irrespective of the amount of aperture.

FIG. 4 of the accompanying drawings is an enlarged view of one of diaphragm blades 10 used in the diaphragm device according to the prior art. FIGS. 5A to 5C of the accompanying drawings show a state in which the diaphragm blades 10 as shown in FIG. 4 are disposed around a diaphragm opening and the diaphragm blades overlap one another when the diaphragm is progressively stopped down from the fully open side to the small aperture side, and FIG. 5D of the accompanying drawings is an enlarged view of the diaphragm opening.

In the diaphragm blade 10 used in the prior-art diaphragm device, as shown in FIG. 4, the portion forming the diaphragm opening, i.e. the inner edge portion 10a of the diaphragm blade 10, is usually formed by a single arc having a fully open aperture or greater. However, in such a diaphragm blade, the marginal portion of the diaphragm opening certainly becomes approximate to a desirable circle in a state approximate to the fully open aperture, but when the diaphragm is stopped down as shown in FIGS. 5A to 5D, the diaphragm opening formed by the diaphragm blades becomes a polygon corresponding to the number of the diaphragm blades and often adversely affects the vignetting of the photograph taken.

On the other hand, in the prior-art diaphragm device constructed of the diaphragm blades 10, the angle of rotation of the blades becomes smaller toward the small aperture side. Therefore, the back-lash between a cam slot provided in a diaphragm blade operating member and pins provided integrally with diaphragm blades fitted therein, or the influence of their machining accuracy or the like upon the aperture diameter becomes relatively great, and this has led to the problem that even a slight back-lash negligible on the fully open aperture side makes the error of the aperture diameter great on the small aperture side.

Also, Japanese Utility Model Publication No. 45-29581 proposes diaphragm blades of the shape as shown in FIG. 6 of the accompanying drawings. FIG. 6 shows only two of the diaphragm blades described in Japanese Utility Model Publication No. 45-29581, and further shows the shape of the diaphragm opening when the diaphragm blades are stopper down, by broken lines. The diaphragm blade 100 has two sides 100a and 100b forming an angle $\theta$, and these two sides form the diaphragm opening. When the number of the sides of a polygon forming the diaphragm opening is n, the angle $\theta$ has a value $$\theta = (n-2) \times 180°/n.$$

The diaphragm blade 100 is disposed so that the angle $\alpha$ it forms with the adjacent diaphragm blade 100' is $\theta = \alpha$. By adopting such a construction, the number of diaphragm blades necessary for forming the diaphragm opening by an n-polygon becomes n/2. Accordingly, even if the number of blades is the same as the number of blades in the prior-art diaphragm device, the polygon of the diaphragm opening formed thereby is twice in the number of sides and therefore, the shape of the diaphragm opening becomes more approximate to a circle.

Also, Japanese Utility Model Publication No. 36-20480 proposes a diaphragm device as shown in FIG. 7 of the accompanying drawings. FIG. 7 shows a pair of diaphragm blades and a cam mechanism in the diaphragm device described in Japanese Utility Model Publication No. 36-20480. The diaphragm blade 110 is of a shape similar to that of the diaphragm blade shown in FIG. 4, and the portion thereof forming a diaphragm opening is formed by a single arc. A cam slot 111 is provided in a diaphragm blade operating member, not shown. By the diaphragm blade operating member rotating about the optic axis O, the diaphragm blade 110 is stopped down. The cam slot 111 is comprised of a cam portion 111a in which a pin 112 provided integrally with the diaphragm blade is fitted to rotate the diaphragm blade, a slot portion 111b connected to the cam portion and provided near the cam portion, and a jetty portion 111c formed by the cam portion 111a and the slot portion 111b and having resiliency. By adopting such a construction, on the small aperture side, the pin 112 of the diaphragm blade is held down in the cam slot by the jetty portion 111c having resiliency and therefore, any back-lash between the cam slot 111 and the pin 112 can be eliminated. Accordingly, it becomes possible to increase the accuracy of the aperture diameter on the small aperture side.

Also, Japanese Laid-Open Utility Model Application No. 50-38735 proposes diaphragm blades of the shape as shown in FIGS. 8A and 8B of the accompanying drawings. FIGS. 8A and 8B show only one of the diaphragm blades of the diaphragm device described in Japanese Laid-Open Utility Model Application No. 50-38735, and FIG. 8A shows the fully open aperture state, and FIG. 8B shows the small aperture state, and in these figures, the letter O designates the optic axis. The portion forming a diaphragm opening is any curve which satisfies the following condition, i.e., such a curve that the angle $\beta$ formed by a straight line $\gamma$ drawn from the center of rotation 0' of the diaphragm blade to the point of contact P between the diaphragm blade and the diaphragm opening and the tangential line S of the diaphragm blade portion forming the diaphragm opening becomes greater toward the small aperture side. The amount of variation in the aperture diameter for the angle of rotation $\theta$ of the diaphragm blade is expressed by $$\overline{O'P} \cdot \theta \cdot \cos \beta.$$

Accordingly, on the small aperture side on which the angle $\beta$ is great, the angle of rotation $\theta$ of the diaphragm blade can be secured more greatly and the error due to the back-lash or the like between the cam slot and the pin can be made relatively small. Further, as regards the error of the position of that portion of the diaphragm blade which forms the diaphragm opening, the component in the direction of the normal to the aforementioned straight line r affects the aperture diameter, but as the angle 8 becomes greater, this amount becomes smaller, and on the small aperture side, the error itself can be made small.

Also, Japanese Laid-Open Patent Application No. 63-8638 proposes a circular diaphragm apparatus. The substance of this publication is that, of the inner edges of diaphragm blades for forming a diaphragm opening, the inner edge portion forming the diaphragm opening during medium stop-down on the pivotable free end side with respect to the inner edge portion forming the fully open diaphragm opening is formed into an arc along the circumference of a circle of a set radius smaller than a predetermined radius about the optic axis in the predetermined medium stop-down posture or an arc approximate thereto, whereby a medium aperture stopped down by one to two steps from the fully open aperture can be formed into a circle or a shape approximate thereto.

However, the constructions as described above have suffered from the following problems. First, the feature of the construction described in the aforementioned Japanese Utility Model Publication No. 45-29581 is that it intends to form a polygonal diaphragm opening having many sides by a small number of diaphragm blades and accordingly, the diaphragm opening is polygonal in both the fully open aperture and the small aperture, and it is difficult from the following point to achieve the purpose of making the shape of the diaphragm opening approximate to a circle by only this construction. That is, to make the shape of the diaphragm opening approximate to a circle, it is necessary to vary R of the corners of the two sides 100a and 100b in accordance with the radius of each aperture, but this is technically difficult. On the other hand, even if a construction is adopted in which the number of diaphragm blades is increased to thereby make the polygon of the diaphragm opening approximate to a circle, to ensure a regular polygon to be formed in each aperture diameter, it is necessary to move the center of rotation O' of each diaphragm blade relative to the optic axis, not shown, and this makes the mechanism very much complicated.

Next, in the cam slot of the structure as shown in FIG. 7 which is described in Japanese Utility Model Publication No. 36-20480, a jetty portion having resiliency is provided to eliminate back-lash, but the resiliency conversely results in weakened strength and the aggravation of the aperture accuracy by the deformation of the cam slot poses a problem. Further, there is also the disadvantage that on the small aperture side, the pin is held down and therefore an unnecessary frictional force is created to cause a reduction in the cam efficiency and this leads to the bad operability when a diaphragm operating ring, not shown, is extraneously operated.

Next, in the diaphragm blade as shown in FIGS. 8A and 8B which is described in Japanese Laid-Open Utility Model Application No. 50-38735, the portion which forms the diaphragm opening is constructed of a curve of a complicated shape and therefore, the polygon of the diaphragm opening becomes a more distorted shape as particularly the aperture diameter becomes greater, and the polygon is partly expanded or is partly broken, and this adversely affects the vignetting of photographs taken.

Next, in the diaphragm blades described in Japanese Laid-Open Patent Application No. 63-8638 a shape approximate to a circle is obtained for each one step before and after the medium aperture set on the fully open and the pivotable free end side, as described therein, but since many of lens barrels have six or more aperture steps from the fully open aperture to the small aperture, this method cannot realize a shape approximate to a circle in all the steps from the fully open aperture to the small aperture.

As noted above, any of the above-described examples of the prior art has been insufficient to solve the problems caused by the diaphragm blade as shown in FIG. 4 which has been used in the prior-art diaphragm device.

SUMMARY OF THE INVENTION

It is the object of the present invention to provide a diaphragm device which ensures a diaphragm opening approximate to a circle to be obtained without a complicated mechanism being provided and is further improved in the accuracy of the aperture diameter on the small aperture side.

In view of the above-noted problems, the diaphragm device according to the present invention is characterized in that a plurality of diaphragm blades cooperate with one another to form a diaphragm opening, the radius of said diaphragm opening is varied by the movement of said diaphragm blades, each of said diaphragm blades has an inner edge portion, the shape of said inner edge portion is formed by a plurality of arcs and/or straight lines being smoothly connected together, and said plurality of arcs are provided equidistantly from the center of rotation of said diaphragm blades and are comprised of three or more arcs of different radii, i.e., a radius approximate to the fully open aperture in a portion near the center of rotation, a radius approximate to the smallest aperture at the end side thereof, and a radius gradually becoming greater within a range smaller than said fully open aperture toward said end side, and straight lines or arcs smoothly connecting said arcs together.

In the diaphragm device according to the present invention, the shape of said inner edge portion is formed by a plurality of arcs and/or straight lines being smoothly connected together, and said plurality of arcs connected together are comprised of three or more arcs of different radii, i.e., a radius approximate to the fully open aperture in a portion near the center of rotation, a radius approximate to the smallest aperture at the end side thereof, and a radius gradually becoming greater within a range smaller than said fully open aperture toward said end side, and straight lines or arcs smoothly connecting said arcs together and therefore, independently of the amount of aperture, the shape of the diaphragm opening becomes very approximate to a circle and also, the angle of interception between adjacent diaphragm blades becomes great and therefore, a diaphragm opening more approximate to a circle can be obtained. Also on the small aperture side, the angle of rotation of the diaphragm blades can be secured greatly, and the accuracy of the aperture diameter on the small aperture side is improved.

BRIEF DESCRIPTION OF THE DRAWINGS

FIG. 3 is a cross-sectional view of a lens barrel having a diaphragm device using the diaphragm blades of the present invention, taken along the direction of the optic axis.

FIG. 4 enlargedly shows only one of diaphragm blades 10 used in the diaphragm device according to the prior art.

FIG. 8A showing the fully open aperture state, and FIG. 8B showing the small aperture state.

DESCRIPTION OF THE PREFERRED EMBODIMENT

Figure 1:
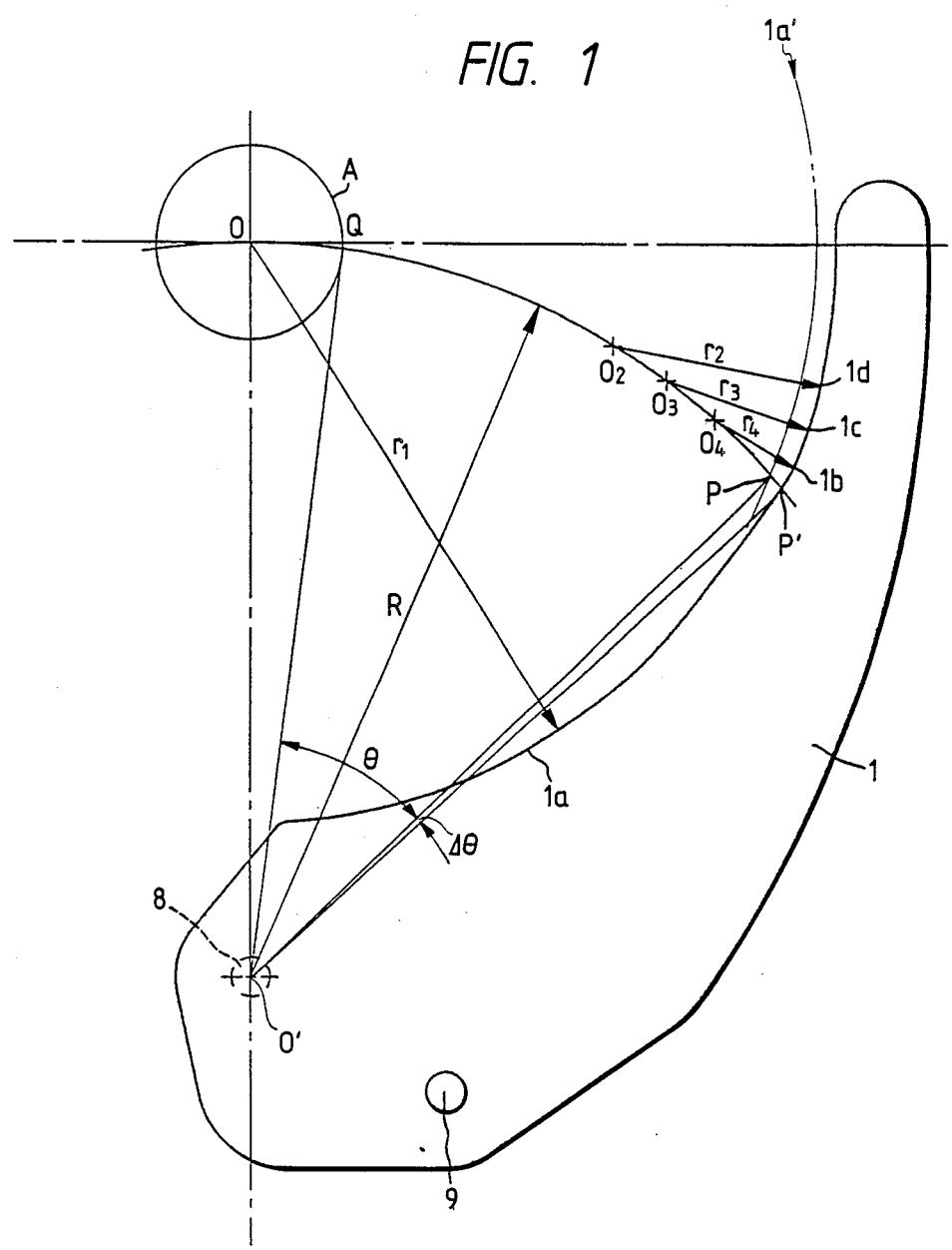
FIG. 1 is a front view showing only one of the diaphragm blades of a diaphragm device according to the present invention.

An embodiment of the present invention will hereinafter be described with reference to the drawings.

FIG. 3 is a cross-sectional view of a lens barrel having a diaphragm device using the diaphragm blades of the present invention, taken along the direction of the optic axis. This lens barrel comprises a lens holding cylinder 12 for holding lens groups L1 and L2, a distance adjustment operating ring 11 containing the lens holding cylinder 12 therein and engaged therewith by a helicoid thread, and a fixed barrel 10 containing the distance adjustment operating ring 11 therein and engaged therewith by a helicoid thread, and having a bayonet mount portion mounted to a camera body, not shown. The lens holding cylinder 12 is rectilinearly movable relative to the fixed barrel 10 by a rectilinear movement key 13 but is not rotatable. By extraneously rotating the distance adjustment operating ring 11, the lens groups L1 and L2 are rectilinearly moved relative to the fixed barrel 10 in the direction of the optic axis 00, whereby distance adjustment can be accomplished. An aperture ring 4 is provided for rotation by a predetermined angle on the outer peripheral portion of the fixed barrel 10 which is adjacent to the camera.

The construction of the diaphragm device of this lens barrel will now be described. A diaphragm blades 1 which are thin plates are provided between a blade operating ring 3 having a cam slot for rotating the diaphragm blades 1 and a fixed ring 2 for holding a pin 8 at the center of rotation of the diaphragm blades. The diaphragm blade operating ring 3 is rotatable about the optic axis OO, and the fixed ring 2 is fixed to the lens holding ring 12. When the aperture ring 4 is extraneously rotated to set the aperture, a diaphragm lever 5 is rotated about a pin 6 by the cam portion 4a of the aperture ring 4 and a pin 7 provided integrally with the diaphragm lever 5. The portion 5a of the diaphragm lever 5 and the portion 3a of the diaphragm blade operating ring 3 are in engagement with each other and therefore, by the rotation of the diaphragm lever 5, the diaphragm blade operating ring 3 is rotated about the optic axis OO, whereby the diaphragm blades 1 are pivotally moved and stopped down to a predetermined aperture diameter. On the other hand, the portion 5b of the diaphragm lever 5 is in engagement with the aperture control lever (not shown) of the camera body, and for example, by an amount electronically determined by the control on the camera side, the diaphragm lever 5 receives a force from the control lever thereof and is moved, whereby it is pivotally moved about the pin 6 and thus, the diaphragm blades are set to the predetermined aperture diameter as previously described. The construction regarding the mechanism of the diaphragm device of the present invention does not particularly differ from that of the prior-art device and will not hereinafter be described in detail.

The shape of the diaphragm blades used in this diaphragm device will now be described with reference to FIG. 1. FIG. 1 is a front view showing only one of the diaphragm blades of the diaphragm device according to the present invention. In FIG. 1, the letter O designates the optic axis, the letter O' denotes the center of rotation of the diaphragm blade 1, and pins 8 and 9 are pins provided integrally with the diaphragm blade 1. The pins 8 and 9 fit in the hole of the fixed ring 2 and to the diaphragm blade, respectively, and as the pin 9 moves along the cam slot, the diaphragm blade 1 is pivotally movable about the pin 8.

That portion of the diaphragm blade 1 which forms the diaphragm opening, i.e., the inner edge portion, is comprised of a plurality of arcs as follows. That is, the inner edge portion is comprised of an arc $1a$ extending from near the center of rotation O' of the diaphragm blade 1 and having the radius $r_1$ of the fully open aperture about the optic axis O, an arc $1b$ having its center at $O_4$ and having the smallest radius $r_4$ among the plurality of arcs, an arc $1c$ having its center at $O_3$ and having a radius $r_3$ which is greater than the radius $r_4$, and an arc $1d$ having its center at $O_2$ and having a radius $r_2$ which is greater than the radius $r_3$. Accordingly, the magnitude relation between these radii is $$r_1 > r_2 > r_3 > r_4.$$

The arcs 1a and 1b, the arcs 1b and 1c, and the arcs 1c and 1d are smoothly connected together. Further, the centers $O_1$, $O_2$, $O_3$ and $O_4$ of the respective arcs are at the equidistance R from the center of rotation O' of the diaphragm blade, and the distance R is equal to the distance OO' between the optic axis and the center of rotation of the diaphragm blade. That is, the centers $O_1$, $O_2$, $O_3$ and $O_4$ and the optic axis lie on the same great arc centered at the center of rotation of the diaphragm blade.

The operation of this diaphragm blade will now be described.

Figure 2A:
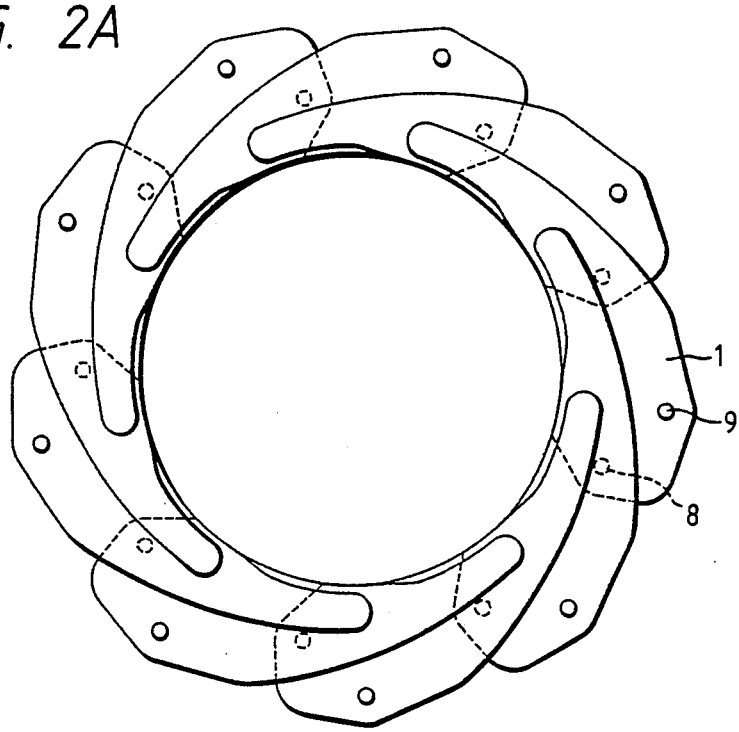
FIGS. 2A to 2D show nine diaphragm blades of FIG. 1 disposed about the optic axis of the diaphragm opening, FIG. 2A showing the fully open aperture state, FIG. 2B showing the state intermediate of the fully open aperture and the minimum aperture, FIG. 2C showing the minimum aperture state, and FIG. 2D showing an enlarged view of the diaphragm opening during the minimum aperture.
Figure 2B:
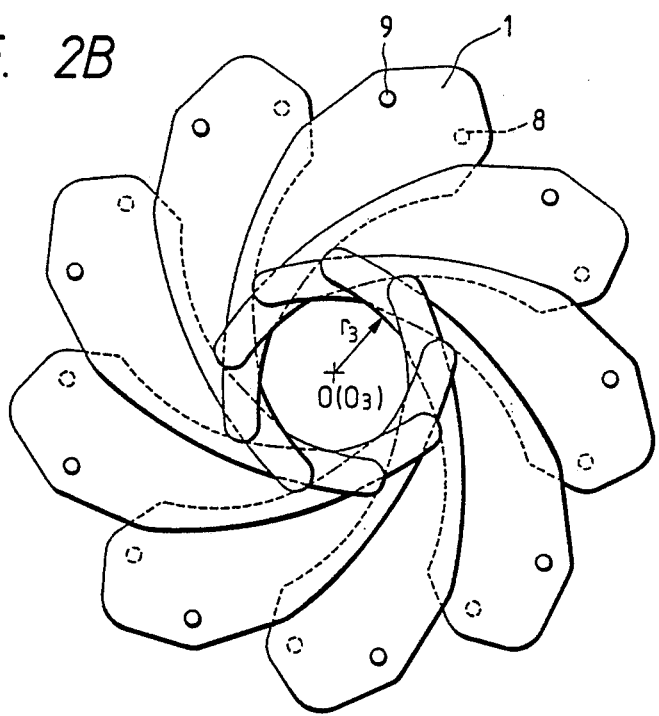
Figure 2C:
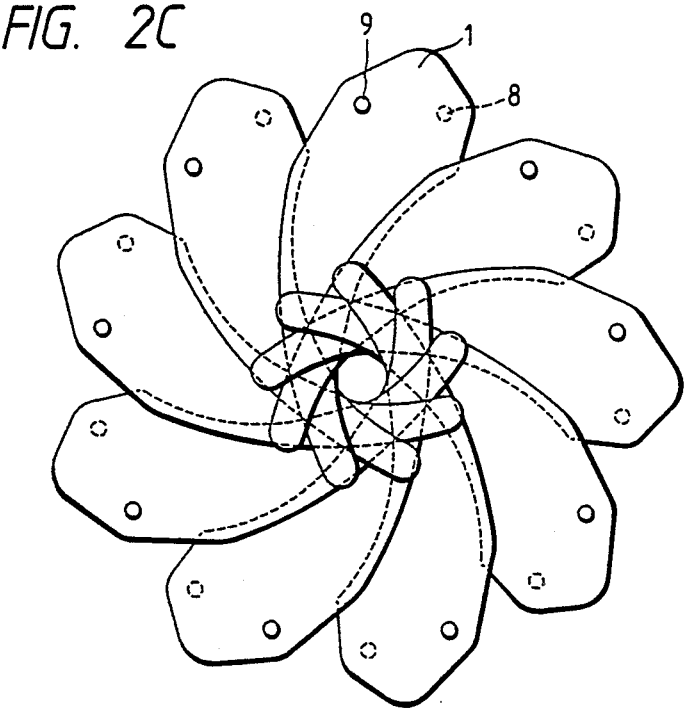
Figure 2D:
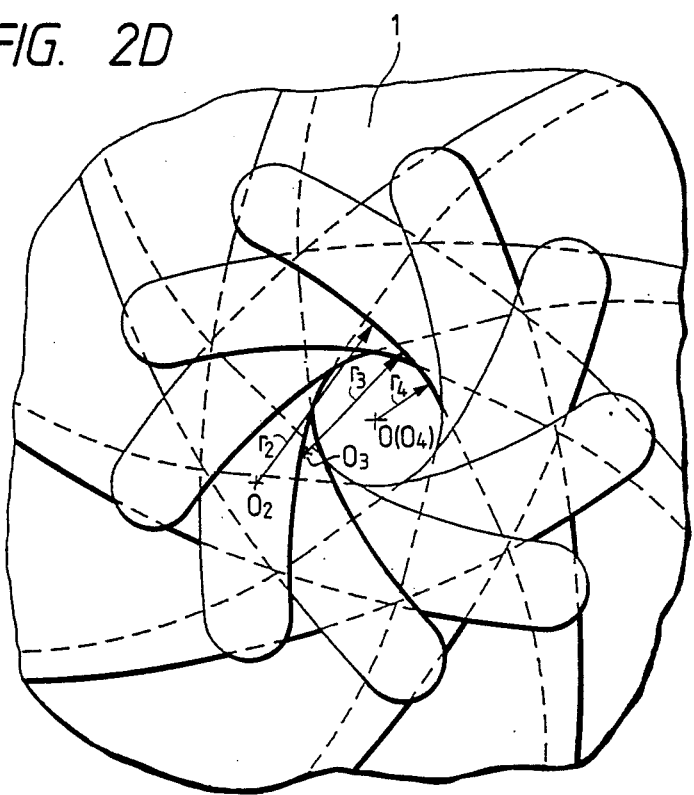
Figure 5A:
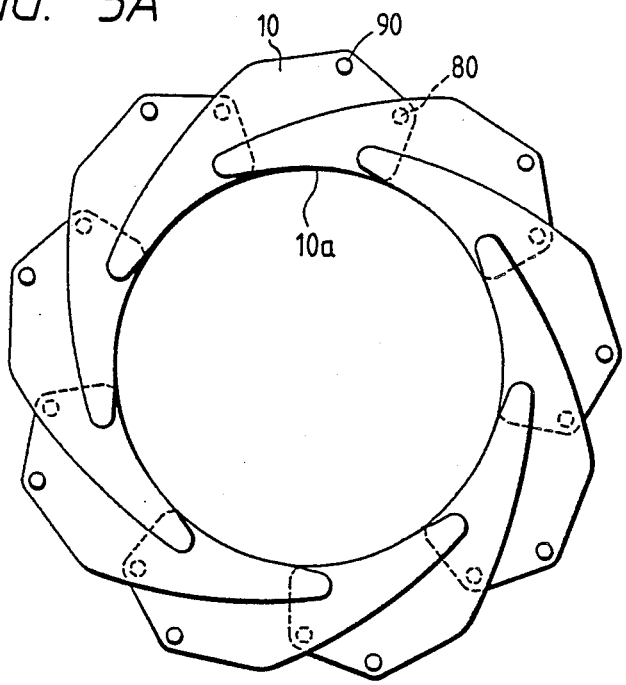
FIGS. 5A to 5D show the overrupping state of the diaphragm blades 10 of FIG. 4 when disposed around the diaphragm opening and gradually stopped down from the fully open side to the small aperture side, and FIG. 5D enlargedly show the diaphragm opening of FIG. 5C.
Figure 5B:
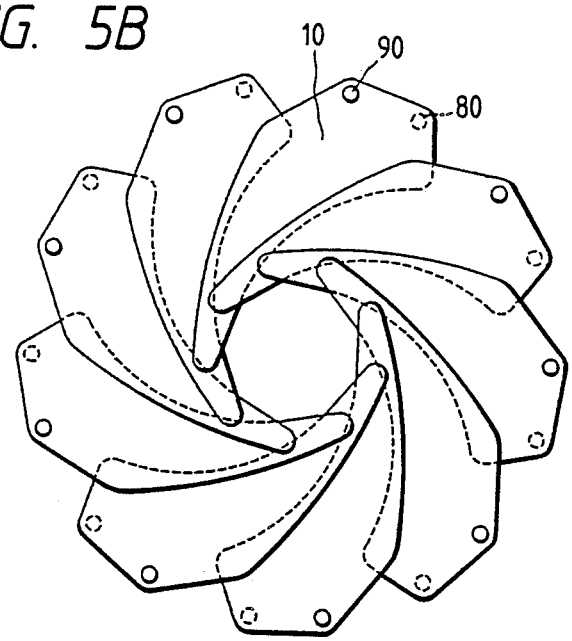
Figure 5C:
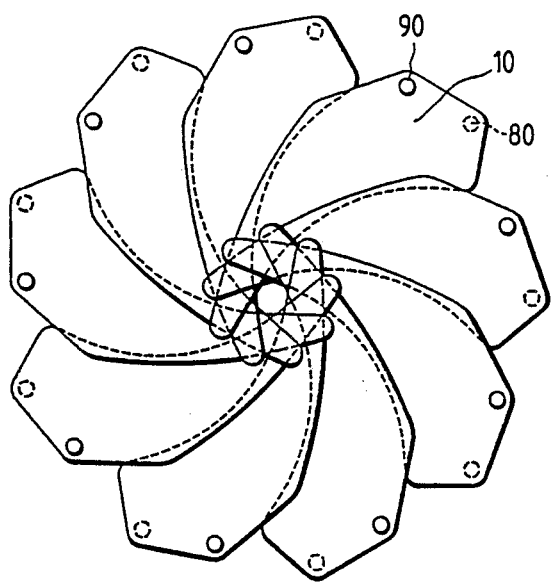
Figure 5D:
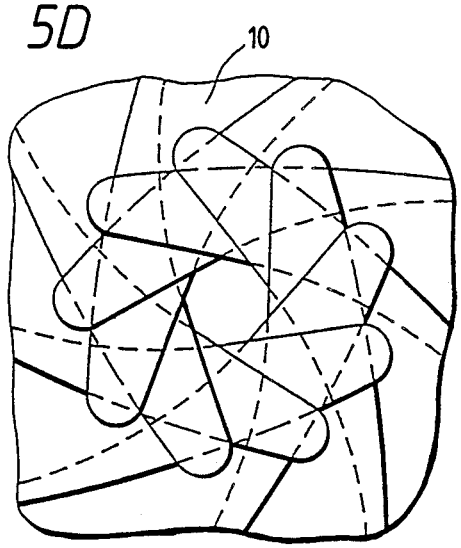
Figure 6:
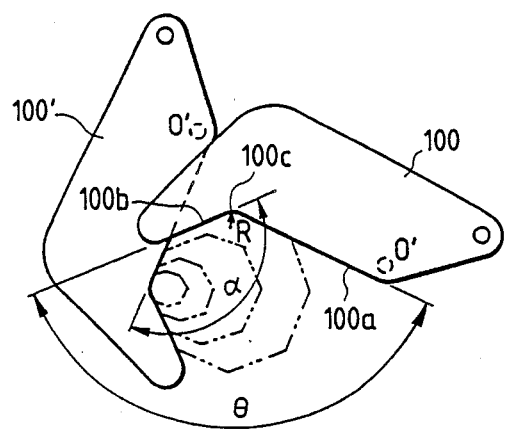
FIG. 6 shows only two of the diaphragm blades described in Japanese Utility Model Publication No. 45-29581, and further shows the shape of the diaphragm opening when said diaphragm blades are stopped down, by broken lines.
Figure 8A:
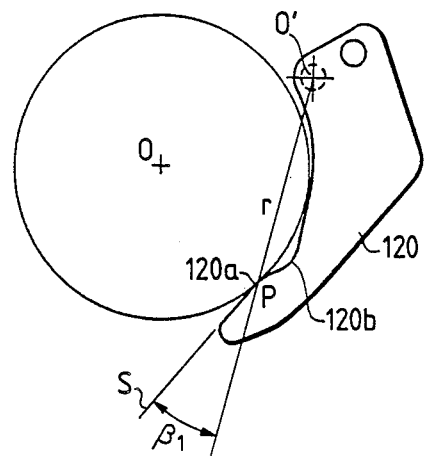
FIGS. 8A and 8B show only one of the diaphragm blades of the diaphragm device described in Japanese Laid-Open Utility Model Application No. 50-38735.
Figure 7:
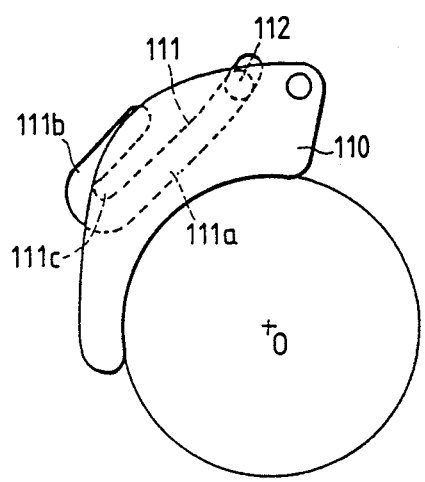
FIG. 7 shows a pair of diaphragm blades and a cam mechanism in the diaphragm device described in Japanese Utility Model Publication No. 36-20480.
Figure 8B:
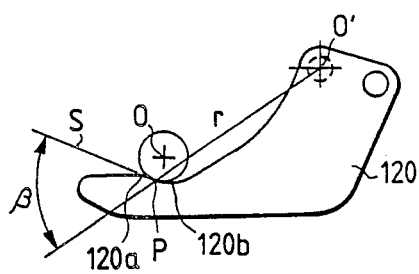

FIGS. 2A to 2D show nine diaphragm blades of FIG. 1 disposed about the optic axis of the diaphragm opening, FIG. 2A showing the fully open aperture state, FIG. 2B showing the state intermediate of the fully open aperture and the minimum aperture, FIG. 2C showing the minimum aperture state, and FIG. 2D showing an enlarged view of the diaphragm opening during the minimum aperture.

By the portion of the diaphragm blades which forms the diaphragm opening being constructed as previously described, when in each aperture state, the diaphragm blades are stopped down until as shown, for example, in FIG. 2D, $O_2$ becomes close to the optic axis O, most of each side of the polygon of the diaphragm opening is comprised of an arc 1d and therefore, though the diaphragm opening is a polygon, it becomes very approximate to a circle of radius $r_2$. Likewise, when $O_3$ becomes close to the optic axis, the diaphragm opening is formed by an arc 1c and the vicinity thereof, and when $O_4$ becomes close to the optic axis, the diaphragm opening is formed by an arc 1b and the vicinity thereof, and the diaphragm opening is of a shape very approximate to circles of radii $r_3$ and $r_4$, respectively.

Description will now be made of the manner in which the diaphragm blades of the present embodiment are stopped down from the fully open aperture. First, in the fully open aperture state, an arc 1a having the radius $r_1$ of the fully open aperture forms the diaphragm opening. At this point of time, the arc 1a is most concerned in prescribing the shape of the diaphragm opening. When the diaphragm blades are further stopped down, the rate at which the arc 1a occupies the diaphragm opening becomes gradually smaller and instead, the next arc 1d comes to occupy most of the diaphragm opening. The arc 1d is an arc which is most concerned in prescribing the shape of the diaphragm opening at this point of time. When the diaphragm blades are further stopped down, the next arc 1c, instead of the arc 1d, occupies most of the diaphragm opening, and when the diaphragm blades are more stopped down, the next arc 1b, instead of the arc 1c, comes to occupy most of the diaphragm opening. Like the above-described arcs 1a and 1d, the arcs 1c and 1b are also arcs which are most concerned in prescribing the shapes of the diaphragm opening at the respective points of time. From the viewpoint of manufacture, it is desirable that the diaphragm blades have interchangeability with other types of cameras. Where use is made of diaphragm blades having interchangeability, the radius of curvature of the greatest arc in the inner edge portion of the diaphragm blades of a certain camera does not always coincide with the greatest aperture of said camera. What is important is that the radius of curvature of the greatest arc is greater than the greatest aperture of the camera.

As described above, the arcs constructing the portion of the diaphragm blades which form the diaphragm opening successively construct each diaphragm opening. Further, in the present embodiment, the portions of intersection between adjacent diaphragm blades are such that one of them is formed by a large arc and the other is formed by an arc smaller than that and therefore, the angles of intersection therebetween become great and the connections therebetween become smooth and thus, there is provided a diaphragm opening more approximate to a circular shape. If FIGS. 2A to 2D which show the present embodiment are compared with FIGS. 5A to 5D which show an example of the prior art, it will be seen how approximate to a circle the diaphragm opening is.

On the other hand, the shape of the diaphragm blades using the present invention is such that the arcs forming the small aperture side have their outermost diameter farther from the optic axis. That is, $$r_1 < \overline{OO_2} + r_2, \quad r_2 < \overline{O_2O_3} + r_3, \quad r_3 < \overline{O_3O_4} + r_4.$$

Accordingly, in the prior art, in order to form a diaphragm opening of a minimum aperture diameter A, rotation of the blades has been necessary until the arc 1a and its imaginary extension 1a' come into contact with the minimum aperture diameter A, i.e., by an angle $\angle LQO'P = \theta$, while in the present embodiment, the smallest diaphragm opening is formed by the arc 1b and therefore, the angle of rotation of the diaphragm blades is $\angle LQO'P' = \theta + \Delta\theta$, and this is greater by $\Delta\theta$ than in the prior art. To make the present invention readily understood, description has been made of the arc 1a of the fully open aperture radius $r_1$, and the arc 1b of the minimum aperture radius $r_4$, but what has been described above also holds true of two adjacent arcs, i.e., $r_4$ and $r_3$, $r_3$ and $r_2$, and $r_2$ and $r_1$, and the provision of more arcs forming the diaphragm opening can result in a greater angle of rotation of the diaphragm blades, that is, in such a manner that the provision of $1a + 1d$ results in a greater angle of rotation than the provision of $1a$ alone, the provision of $1a + 1d + 1c$ results in a greater angle of rotation than the provision of $1a + 1d$, and the provision of $1a + 1d + 1c + 1b$ results in a greater angle of rotation than the provision of $1a + 1d + 1c$. Thus, the error imparted to the accuracy of the aperture diameter by the back-lash or the like between the cam slot and the pin which has heretofore been a problem on the small aperture side can be made relatively small by making the angle of rotation of the blades great, and an improvement in the accuracy of the aperture diameter on the small aperture side is possible. Further, the diaphragm blades of the diaphragm device according to the present invention obtains the great effect as described above by only the shape thereof being changed and therefore, permits the use of the mechanism of the existing diaphragm device and also, the diaphragm blades themselves can be simply manufactured with good accuracy as by press and therefore, the manufacturing cost thereof becomes very low and the assembly thereof does not at all differ from the case of the existing diaphragm device.

While an embodiment of the diaphragm device according to the present invention has been described with reference to the drawings, the present invention is of course not restricted to the above-described embodiment, but can be suitably changed and improved within a scope which will not spoil the gist of the invention. For example, what forms the inner edge portion of the diaphragm blade is not limited to four arcs, but may be three arcs. Also, the number of arcs may be as many as desired.

Also, the present embodiment is of a construction in which R approximate to the fully open aperture from the center of rotation side, R approximate to the minimum aperture and R which becomes gradually greater in radius toward the end therefrom are smoothly connected together by straight lines or arcs, but depending on the sizes of the respective R's and the central positions of the arcs, it is theoretically also possible to set R's so that R is made gradually smaller from the R approximate to the fully open aperture from the center of rotation side to the R approximate to the minimum aperture, and to connect the R's smoothly by straight lines or arcs. However, when such a construction is adopted, unlike the present embodiment, the radius of the arc which is most concerned in the shape of the aperture in the intermediate aperture always becomes smaller than the radius necessary to make the diaphragm opening circular and therefore, the shape of the aperture becomes difficult to be said to be circular as compared with the present embodiment.

Also, the shape of the inner edge portion from R approximate to the fully open aperture of the diaphragm blades to R approximate to the minimum aperture is a shape convex toward the optic axis side, as compared with the present embodiment, and even in a state in which the diaphragm blades are slightly stopped down from the fully open aperture, the shape of the aperture becomes difficult to be said to be circular. Of course, if the distance between the center of the arc of R approximate to the minimum aperture and the optic axis is made small, R's can be smoothly connected, but for that purpose, the distance of the outer portion of the diaphragm blade from the optic axis becomes great, and this leads to the disadvantage that the diaphragm chamber need be made large and the outer diameter of the lens barrel becomes great.

In contrast, in the diaphragm device according to the present embodiment, the shape of said inner edge portion is formed by a plurality of arcs and/or straight lines being smoothly connected together, and said plurality of arcs connected together comprise three or more arcs of different radii, i.e., a radius approximate to the fully open aperture in the portion near the center of rotation, a radius approximate to the minimum aperture on the end side therefrom, and a radius which becomes gradually greater within a range smaller than said fully open aperture further toward said end side, and straight lines or arcs smoothly connecting said arcs, and therefore, independently of the amount of aperture, the shape of the diaphragm opening becomes very approximate to a circle and also, the angle of intersection between adjacent diaphragm blades becomes great and therefore, a diaphragm opening more approximate to a circle can be obtained. Also on the small aperture side, the angle of rotation of the diaphragm blades can be secured greatly, and the accuracy of the aperture diameter on the small aperture side is improved.

We claim:

1. A diaphragm device in which the aperture of a diaphragm opening is variable from a minimum aperture to a fully open aperture, comprising:

a plurality of diaphragm blades each having a pivot center, the edge portion of said diaphragm opening being formed by an inner edge portion in which said diaphragm blades overlap one another; and driving means for rotating said plurality of diaphragm blades about said pivot centers at a time;

said inner edge portion including a first arc disposed in a first portion nearest to said pivot center and having a radius of curvature ($r_1$) substantially equal to said fully open aperture, a second arc disposed in a second portion farther from said pivot center than said first portion and having a radius of curvature ($r_4$) substantially equal to said minimum aperture, at least one third arc disposed in a third portion farther from said pivot center than said second portion and having a radius of curvature ($r_3$, $r_2$) gradually becoming greater away from said pivot center within a range smaller than said fully open aperture and greater than said minimum aperture, and straight lines or curves smoothly connecting adjacent ones of said arcs together;

the centers of curvature of said arcs lying equidistantly from the pivot center of said diaphragm blades.

2. The diaphragm device of claim 1, wherein said third portion is comprised of two arcs differing in radius of curvature from each other.

3. The diaphragm device of claim 1, wherein when a circle is depicted with said pivot center as the center thereof and with the distance from said pivot center to the center of said diaphragm opening as the radius thereof, the centers of the radii of curvature of said plurality of arcs all lie on said circle.

4. The diaphragm device of claim 1, wherein when the radius of curvature of an arc forming a part of said inner edge portion is $r_i$ and the center of curvature thereof is $O_i$ and the radius of curvature of another arc having a smaller radius of curvature than said arc is $r_{i+1}$ and the center of curvature thereof is $O_{i+1}$, the following relation is established therebetween:

$$r_i < \overline{O_i O_{i+1}} + r_{i+1}.$$

* * * * *